(12) United States Patent
Nair et al.

(10) Patent No.: US 11,792,172 B2
(45) Date of Patent: Oct. 17, 2023

(54) PRIVACY INDICATORS FOR CONTROLLING AUTHENTICATION REQUESTS

(71) Applicant: Nokia Technologies Oy, Espoo (FI)

(72) Inventors: Suresh P. Nair, Whippany, NJ (US); Anja Jerichow, Grafing (DE); Annett Seefeldt, Berlin (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/794,856

(22) Filed: Oct. 26, 2017

(65) Prior Publication Data
US 2018/0324585 A1 Nov. 8, 2018

Related U.S. Application Data

(60) Provisional application No. 62/502,266, filed on May 5, 2017.

(51) Int. Cl.
*H04L 9/40* (2022.01)
*H04W 12/02* (2009.01)
(Continued)

(52) U.S. Cl.
CPC .......... *H04L 63/0442* (2013.01); *H04L 63/06* (2013.01); *H04L 63/083* (2013.01);
(Continued)

(58) Field of Classification Search
CPC ... H04W 12/04; H04W 12/06; H04W 12/033; H04W 12/041; H04W 12/069;
(Continued)

(56) References Cited

U.S. PATENT DOCUMENTS 9,344,881 B2  5/2016 Forsberg et al.
9,801,055 B2 * 10/2017 Palanigounder .... H04L 63/0428
(Continued)

FOREIGN PATENT DOCUMENTS

CN 102084608 A 6/2011
CN 103841551 A 6/2014
(Continued)

OTHER PUBLICATIONS

Ericsson, "Alignment according to withdrawal of I-WLAN feature," 3rd Generation Partnership Project (3GPP), http://www.3gpp.org/ftp/Meetings_3GPP_SYNC/SA/Docs/, Nov. 11, 2016, 55 pages.
(Continued)

*Primary Examiner* — Beemnet W Dada
(74) *Attorney, Agent, or Firm* — ALSTON & BIRD LLP

(57) ABSTRACT

Techniques for providing privacy features in communication systems are provided. For example, a message may be provided from user equipment to an element or function in a communication network that comprises one or more privacy indicators, where privacy features for processing the message are determined based on the privacy indicators. The message may comprise an attach request comprising a subscription identifier for a subscriber associated with the user equipment, with the privacy indicators comprising a flag indicating whether the subscription identifier in the attach request is privacy-protected. As another example, the element of function in the communication network may determine privacy features supported by the communication network and generate and send a message to user equipment comprising one or more privacy indicators selected based on the determined privacy features. The privacy indicators may comprise an indication of whether the communication network is configured for handling privacy-protected subscription identifiers.

32 Claims, 7 Drawing Sheets

(51) Int. Cl.
　　　*H04W 12/033*　　(2021.01)
　　　*H04W 12/041*　　(2021.01)
　　　*H04W 12/069*　　(2021.01)
(52) U.S. Cl.
　　　CPC ......... *H04L 63/0876* (2013.01); *H04W 12/02* (2013.01); *H04W 12/033* (2021.01); *H04W 12/041* (2021.01); *H04W 12/069* (2021.01)
(58) Field of Classification Search
　　　CPC ...... H04W 12/02; H04L 63/06; H04L 63/083; H04L 63/0876; H04L 63/0442; H04L 29/06
　　　See application file for complete search history.

(56) References Cited

U.S. PATENT DOCUMENTS

| | | | |
|---|---|---|---|
| 10,389,691 | B2 | 8/2019 | Zhu et al. |
| 10,455,385 | B2 | 10/2019 | Babbage et al. |
| 10,609,561 | B2 | 3/2020 | Nakarmi et al. |
| 10,873,464 | B2 | 12/2020 | Muhanna et al. |
| 10,931,644 | B2 | 2/2021 | Norrman et al. |
| 2003/0023451 | A1* | 1/2003 | Willner ............... G06F 21/6245 713/151 |
| 2006/0196931 | A1 | 9/2006 | Hohmanns et al. |
| 2006/0227955 | A1 | 10/2006 | Thai et al. |
| 2008/0130898 | A1* | 6/2008 | Holtmanns ......... H04L 63/0414 380/278 |
| 2010/0015951 | A1 | 1/2010 | Hahn et al. |
| 2010/0067676 | A1 | 3/2010 | Thai et al. |
| 2011/0191576 | A1 | 8/2011 | Forsberg et al. |
| 2013/0080779 | A1 | 3/2013 | Holtmanns et al. |
| 2013/0170643 | A1 | 7/2013 | Xiao et al. |
| 2014/0141746 | A1 | 5/2014 | Tan et al. |
| 2014/0359148 | A1* | 12/2014 | Cherian ................ H04W 12/06 709/229 |
| 2015/0148020 | A1 | 5/2015 | Laden et al. |
| 2016/0014630 | A1 | 1/2016 | Xu et al. |
| 2016/0098566 | A1 | 4/2016 | Patil et al. |
| 2017/0006469 | A1 | 1/2017 | Palanigounder |
| 2017/0070880 | A1 | 3/2017 | Hahn et al. |
| 2017/0094499 | A1 | 3/2017 | Nenner et al. |
| 2017/0164070 | A1 | 6/2017 | Yang et al. |
| 2017/0238122 | A1* | 8/2017 | Yang ..................... H04W 12/06 370/310 |
| 2017/0332192 | A1* | 11/2017 | Edge ..................... H04W 64/00 |
| 2018/0014198 | A1 | 1/2018 | Suh et al. |
| 2018/0270666 | A1* | 9/2018 | Lee ........................ H04L 9/3242 |
| 2019/0246275 | A1 | 8/2019 | Nakarmi et al. |
| 2020/0322794 | A1 | 10/2020 | Baltatu et al. |

FOREIGN PATENT DOCUMENTS

| | | |
|---|---|---|
| CN | 105308992 A | 2/2016 |
| CN | 105900359 A | 8/2016 |
| CN | 106416329 A | 2/2017 |
| EP | 3281433 | 2/2018 |
| JP | 2000-031980 A | 1/2000 |
| JP | 6757845 B2 | 9/2020 |
| KR | 1020120120324 A | 11/2012 |
| KR | 102233860 B1 | 3/2021 |
| RU | 2185027 C1 | 7/2002 |
| RU | 2253948 C1 | 6/2005 |
| WO | WO 2016/117907 | 7/2016 |
| WO | PCT/US2016/160256 | 10/2016 |
| WO | WO 2016/160256 A1 | 10/2016 |
| WO | WO 2016/162322 A1 | 10/2016 |
| WO | PCT/US2018/030143 | 7/2018 |

OTHER PUBLICATIONS

Office Action for Russian Application No. 2019139361/28(077409) dated Jun. 18, 2020, 11 pages.
International Search Report and Written Opinion for Application No. PCT/US2018/030143 dated Jul. 19, 2018, 11 pages.
Decision to Grant A Patent for Invention for Russian Application No. 2019139361/08 dated Oct. 6, 2020, 13 pages.
Office Action for European Application No. 18725091.5 dated Aug. 19, 2020, 6 pages.
Office Action from European Patent Application No. 18725091.5, filed Nov. 17, 2020, 4 pages.
Office Action for Kenya Application No. AP/P/2019/011959 dated Jul. 6, 2021, 4 pages.
Office Action for European Application No. 18725091.5 dated Jun. 14, 2021, 5 pages.
Office Action for Korean Application No. 10-2019-7036048 dated May 3, 2021, 12 pages.
Written Opinion for Singapore Patent Application No. 11201910230W dated Mar. 17, 2021, 7 pages.
Office Action for Canadian Patent Application No. 3,062,521, dated Dec. 21, 2020, 4 pages.
Office Action for Japanese Patent Application No. 2019-560230 dated Jan. 3, 2020, with English translation, 22 pages.
Office Action for Korean Application No. 10-2019-7036048 dated Nov. 18, 2021, 4 pages.
First Examination Report for Indian Application No. 201947049204 dated Jul. 14, 2021, 7 pages.
Office Action for Japanese Application No. 2019-560230 dated Sep. 15, 2021, 5 pages.
Office Action for Chinese Application No. 201880040462.2 dated Aug. 4, 2021, 11 pages.
Decision to Grant for Japanese Application No. 2019-560230 dated Mar. 28, 2022, 4 pages.
Ericsson, "Alignment According to Withdrawal of I-WLAN Feature", 3GPP TSG-SA3 Meeting #85, S3-162018, Change Request 33.402 CR 0131 Rev 1, (Nov. 7-11, 2016), 55 pages.
Ericsson, "Comment on S3-170878—Commenting Contribution to S3-170625—Conclusions of Security Area 7", 3GPP TSG SA WG3 (Security) Meeting #86-Bis, S3-170879, (Mar. 27-31, 2017), 1 page.
Notice of Acceptance for South African Application No. 2019/09865 dated Apr. 6, 2022, 1 page.
Notice of Allowance for Korean Application No. 10-2019-7036048 dated Jan. 20, 2022, 3 pages.
Office Action for ARIPO Application No. AP/P/2019/011959 dated Feb. 11, 2022, 4 pages.
Office Action for Australian Application No. 2018261590 dated Feb. 28, 2022, 4 pages.
Office Action for Canadian Application No. 3,062,521 dated Oct. 21, 2021, 5 pages.
Office Action for Chinese Application No. 201880040462.2 dated Mar. 16, 2022, 8 pages.
Office Action for Colombian Application No. NC2019/0013129 dated May 9, 2022, 11 pages.
Office Action for Indonesian Application No. P00201910978 dated Feb. 3, 2022, 5 pages.
Office Action for Singapore Application No. 11201910230W dated Jan. 10, 2022, 8 pages.
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 15)", 3GPP 29.272 v15.1.0, (Sep. 2017), 166 pages.
"3rd Generation Partnership Project; Technical Specification Group Core Network and Terminals; Numbering, addressing and identification (Release 15)", 3GPP TS 23.003 v15.6.0, (Dec. 2018), 130 pages.
"3rd Generation Partnership Project; Technical Specification Group Services and System Aspects; Procedures for the 5G System; Stage 2 (Release 15)", 3GPP TS 23.502 v15.4.1, (Jan. 2019), 347 pages.
"3rd Generation Partnership Project; Technical Specification Group Services and System Aspects; Security architecture and procedures for 5G system (Release 15)", 3GPP TS 33.501 v15.4.0, (Mar. 2019), 187 pages.
China Mobile et al., "pCR Security Enhancement to the Attach Procedure Without Relying on PKI", 3GPP TSG SA WG3 (Security) Meeting #85, S3-161775, (Nov. 7-11, 2016), 5 pages.

(56) References Cited

OTHER PUBLICATIONS

China Mobile, "Update the Solution #7.10", 3GPP TSG SA WG3 (Security) Meeting #86bis, S3-170772, (Mar. 27-31, 2017), 2 pages.
Ericsson, "Evaluation of Two New Privacy Solutions", 3GPP TSG SA WG3 (Security) Meeting #86-Bis, S3-170746, (Mar. 27-31, 2017), 2 pages.
Ericsson, "New KI—Privacy Aspects of RAN Level Subscription Identifiers", 3GPP TSG-SA WG3 Meeting #86, S3-170226, (Feb. 6-10, 2017), 2 pages.
Ericsson, "Update to Key Issue #2.3, and a New Solution on Identifiers Demonstrating the Proposed Terms", 3GPP TSG-SA WG3 Meeting #86, S3-170285, (Feb. 6-10, 2017), 8 pages.
Huawei et al., "Identity Privacy and Backwards Compatibility", 3GPP TSG SA WG3 (Security) Meeting #85, S3-161715, (Nov. 7-11, 2016), 6 pages.
Huawei et al., "Identity Privacy and Backwards Compatibility", 3GPP TSG SA WG3 (Security) Meeting #85, S3-162107, (Nov. 7-11, 2016), 6 pages.
Huawei et al., "MASA Handling Privacy and Meeting LI Requirements in All Scenarios", 3GPP TSG SA WG3 (Security) Meeting #86b, S3-170612, (Mar. 27-31, 2017), 3 pages.
Huawei et al., "MASA Solution Protecting Subscriber IMSI Privacy", 3GPP TSG SA WG3 (Security) Meeting #86b, S3-170619, (Mar. 27-31, 2017), 4 pages.
Huawei et al., "Update Requirement on Long Term Identifier Aspect of Key Issue 7.2", 3GPP TSG SA WG3 (Security) #85, S3-161681, (Nov. 7-12, 2016), 1 page.
Huawei et al., "Use of Legacy USIM and NextGen ME in Solution #7.12", 3GPP TSG SA WG3 (Security) Meeting #86, S3-170062, (Feb. 6-10, 2017), 6 pages.
Intel, "pCR to TR 33.899: Securing and Refreshing the Temporary Subscriber Identifiers", 3GPP TSG SA WG3 (Security) Meeting #86-Adhoc, S3-170632, (Mar. 26-31, 2017), 4 pages.
Nokia et al., "Additional Requirement on Transmission of Identities in Key Issue 7.6", 3GPP TSG-SA3 Meeting #85, S3-161842, (Nov. 7-11, 2016), 1 page.
Nokia, "Commenting Contribution to S3-170625—Conclusions of Security Area 7", 3GPP TSG SA WG3 (Security) Meeting #86-Bis, S3-170878, (Mar. 27-31, 2017), 1 page.
Nokia, "Open Questions Related to Concealment of Temporary Identifiers", 3GPP TSG SA WG3 (Security) Meeting #86bis, S3-170765, (Mar. 27-31, 2017), 1 page.
Nokia, "Open Questions Related to Key Issue #7.2—Concealment of Identifiers", 3GPP TSG SA WG3 (Security) Meeting #86, S3-170199, (Feb. 6-10, 2017), 1 page.
Nokia, "Open Questions Related to Key Issue #7.2—Concealment of Identifiers", 3GPP TSG SA WG3 (Security) Meeting #86bis, S3-170763, (Mar. 27-31, 2017), 1 page.
Nokia, "Open Questions Related to Key Issue #7.9—Full Protection of Permanent Identifier", 3GPP TSG SA WG3 (Security) Meeting #86bis, S3-170766, (Mar. 27-31, 2017), 1 page.
Nokia, "Privacy Solution", 3GPP TSG SA WG3 (Security) Meeting #85, S3-161830, (Nov. 7-11, 2016), 3 pages.
Nokia, "Privacy Solution", 3GPP TSG SA WG3 (Security) Meeting #85, S3-162061, (Nov. 7-11, 2016), 3 pages.
Nokia, "Solution Variant to #7.3", 3GPP TSG SA WG3 (Security) Meeting #86Bis, S3-170757, (Mar. 27-31, 2017), 1 page.
Qualcomm et al., "pCR to Update Solution #7.4: Privacy Enhanced Mobile Subscriber Identifier (PMSI)", 3GPP TSG SA WG3 (Security) Meeting #86bis, S3-170832, (Mar. 27-31, 2017), 5 pages.
Qualcomm Incorporated, "Enahncements to Solution 6.9 on Encrypting IMSI to Provide Privacy from the Serving Network", 3GPP TSG SA WG3 (Security) Meeting #85, S3-161814, (Nov. 7-11, 2016), 8 pages.
Qualcomm Incorporated, pCR to Provide an Evaluation on the Solution #7.4 Privacy Enhanced Mobile Subscription Identifier (PMSI), 3GPP TSG SA WG3 (Security) Meeting #86bis, S3-170837, (Mar. 27-31, 2017), 2 pages.
Qualcomm Incorporated, "pCR to Update Solution #7.4: Privacy Enahnced Mobile Subscriber Identifier (PMSI) to Clarify the PMSI Synchronization", 3GPP TSG SA WG3 (Security) Meeting #86bis, S3-170836, (Mar. 27-31, 2017), 4 pages.
Qualcomm Incorporated, "pCR to Update Solution #7.14: Privacy Enhanced Mobile Subscriber Identifier (PMSI)", 3GPP TSG SA WG3 (Security) Meeting #86, S3-170293, (Feb. 6-10, 2017), 5 pages.
Qualcomm Incorporated, "Privacy & Security of Registration and Slice Selection Information", 3GPP TSG SA WG3 (Security) Meeting #86Bis, S3-170845, (Mar. 27-31, 2017), 2 pages.
Telecom Italia et al., "Updating Solution #7.14 Privacy Protection of Permanent or Long-Term Subscription Identifier Using Abe", 3GPP TSG-SA WG3 Meeting #86, S3-170343, (Feb. 6-10, 2017), 9 pages.
Telecom Italia, "Comments to pCR to TR 33.899—Evaluations and Conclusions in Clause 7", 3GPP TSG SA WG3 (Security) Meeting #86-Bis, S3-170877, (Mar. 27-31, 2017), 13 pages.
Telecom Italia, "Updating Solution #7.14 Privacy Protection of Permanent or Long-Term Subscription Identifier Using Abe", 3GPP TSG SA WG3 (Security) Meeting #86bis, S3-170784, (Mar. 27-31, 2017), 9 pages.
Telecom Italia, "Updating solution #7.14 Privacy Protection of Permanent or Long-Term Subscription Identifier Using ABE:", 3GPP TSG-SA WG3 Meeting #86, S3-170187, (Feb. 6-10, 2017), 8 pages.
Thales, "pCR for Adding Solution for Key Issue #7.2: Concealing Permanent or Long-Term Subscriber Identifier with Opportunistic Encryption", 3GPP TSG SA WG3 (Security) Meeting #85, S3-161620, (Nov. 7-11, 2016), 3 pages.
Vodafone et al., "pCR to TR 33.899—Updating Key Issue 7.3", 3GPP TSG SA WG3 (Security) Meeting #86, S3-170080, (Feb. 6-10, 2017), 4 pages.
Office Action for ARIPO Application No. AP/P/2019/011959 dated Jul. 6, 2021, 4 pages.
Notice of Acceptance for ARIPO Application No. AP/P/2019/011959 dated Aug. 25, 2022, 5 pages.
Office Action for Australian Application No. 2018261590 dated Jul. 5, 2022, 3 pages.
Office Action for Canadian Application No. 3,062,521 dated Aug. 4, 2022, 4 pages.
Office Action for European Application No. 18725091.5 dated Sep. 29, 2022, 6 pages.
Office Action for Chinese Application No. 201880040462.2 dated Aug. 3, 2022, 8 pages.
Office Action for Korean Application No. 10-2022-7013200 dated Jun. 29, 2022, 6 pages.
3GPP, "3rd Generation Partnership Project; Technical Specification Group Services and System Aspects; System Architecture for the 5G System; Stage 2 (Release 15)," 3GPP TS 23.501 V0.4.0, Apr. 2017, 124 pages.
3GPP, "3rd Generation Partnership Project; Technical Specification Group Services and System Aspects; Study on the Security Aspects of the Next Generation System (Release 14)," 3GPP TR 33.899 V1.1.0, Mar. 2017, 491 pages.
3GPP, "3rd Generation Partnership Project; Technical Specification Group Services and System Aspects; Procedures for the 5G System; Stage 2 (Release 15)," 3GPP TS 23.502 V0.1.0, Jan. 2017, 44 pages.
3GPP, "3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol, (Release 14)," 3GPP TS 29.272 V14.0.0, Jun. 2016, 153 pages.
Notice of Acceptance for Australian Application No. 2018261590 dated Jan. 18, 2023, 3 pages.
Notice of Allowance for Korean Application No. 10-2022-7013200 dated Dec. 29, 2022, 4 pages.
Notice of Allowance for Korean Application No. 10-2023-7010706 dated May 31, 2023, 3 pages.
Office Action for Canadian Application No. 3,062,521 dated Jun. 9, 2023, 8 pages.
Office Action for European Application No. 18725091.5 dated May 19, 2023, 4 pages.
Office Action for Indonesian Application No. P00201910978 dated Apr. 12, 2023, 4 pages.

(56) References Cited

OTHER PUBLICATIONS

Office Action for Japanese Application No. 2022-073183 dated May 30, 2023, 4 pages.
Office Action for Mexico Application No. MX/a/2019/013181 dated Apr. 19, 2023, 10 pages.
Office Action for Singapore Application No. 11201910230W dated May 8, 2023, 6 pages.
Notice of Eligibility of Grant for Singapore Application No. 11201910230W dated May 8, 2023, 6 pages.
Office Action for Vietnamese Application No. 1-2019-06835 dated Jun. 21, 2023, 3 pages.

* cited by examiner

PRIVACY INDICATORS FOR CONTROLLING AUTHENTICATION REQUESTS

CROSS-REFERENCE TO RELATED APPLICATION

The present application claims priority to the U.S. Provisional patent application identified as U.S. Ser. No. 62/502,266 filed May 5, 2017 and entitled "Privacy Indicator for Controlling Authentication Requests," the disclosure of which is incorporated by reference herein in its entirety.

FIELD

The field relates generally to communication systems, and more particularly, but not exclusively, to security within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services intended to provide improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network or an eNB (evolved Node B) in an LTE network. The access point (e.g., gNB/eNB) is illustratively part of an access network of the communication system. For example, in a 5G network, the access network is referred to as a 5G System and is described in 5G Technical Specification (TS) 23.501, V0.4.0, entitled "Technical Specification Group Services and System Aspects; System Architecture for the 5G System," the disclosure of which is incorporated by reference herein in its entirety. In an LTE network, the access network is an Evolved Universal Terrestrial Radio Access Network (E-UTRAN). In general, the access point (e.g., gNB/eNB) provides access for the UE to a core network (CN), which then provides access for the UE to other UEs and/or a data network such as a packet data network (e.g., Internet).

Privacy is an important consideration in any communication system. Privacy is broadly addressed in 5G Technical Report (TR) 33.899, V1.1.0, entitled "3rd Generation Partnership Project; Technical Specification Group Services and System Aspects; Study on the security aspects of the next generation system (Release 14)," the disclosure of which is incorporated by reference herein in its entirety. In particular, TR 33.899 identifies subscription (UE) privacy as one of the most important security areas to be addressed in 5G networks.

SUMMARY

Illustrative embodiments provide one or more privacy indicators for controlling authentication requests in communication systems.

For example, in one embodiment, a method comprises receiving, at an element or function in a communication network from user equipment of the communication network, a message comprising one or more privacy indicators and determining one or more privacy features for processing the message based on the one or more privacy indicators.

The message may comprise an attach request comprising a subscription identifier for a subscriber of the communication network associated with the user equipment, the one or more privacy indicators comprising a flag indicating whether the subscription identifier in the attach request is privacy-protected. The privacy-protected subscription identifier may comprise at least a portion of a permanent subscription identifier of the subscriber.

In another embodiment, a method comprises determining, at an element or function in a communication network, one or more privacy features supported by the communication network, generating, at the element or function in the communication network, a message comprising one or more privacy indicators selected based on the determined one or more privacy features, and sending, from the element or function in the communication network to user equipment of the communication network, the generated message comprising the one or more privacy indicators.

The one or more privacy features may comprise an ability of the element or function in the communication network to handle privacy-protected subscription identifiers.

In another embodiment, a method comprises determining, at user equipment of a communication network, one or more privacy features for processing a message, adding one or more privacy indicators to the message based on the determined one or more privacy features, and sending the message with the one or more privacy indicators from the user equipment to an element or function in the communication network.

The message may comprise an attach request comprising a subscription identifier for a subscriber of the communication network associated with the user equipment, the one or more privacy indicators comprising a flag indicating whether the subscription identifier in the attach request is privacy-protected.

In another embodiment, a method comprises receiving, at user equipment of a communication network from an element or function in the communication network, a message comprising one or more privacy indicators and determining one or more privacy features supported by the communication network utilizing the one or more privacy indicators.

The one or more privacy indicators may comprise an indication of whether the communication network is configured for handling privacy-protected subscription identifiers. The method may further comprise refraining from sending an attach request to the element or function in the communication network responsive to the one or more privacy indicators indicating that the communication network is not configured for handling privacy-protected subscription identifiers.

While these and other techniques described herein can be applied to various communication networks, they are particularly suitable for 5G and next generation communication networks.

These and other features and advantages of embodiments described herein will become more apparent from the accompanying drawings and the following detailed description.

DETAILED DESCRIPTION

Figure 1:
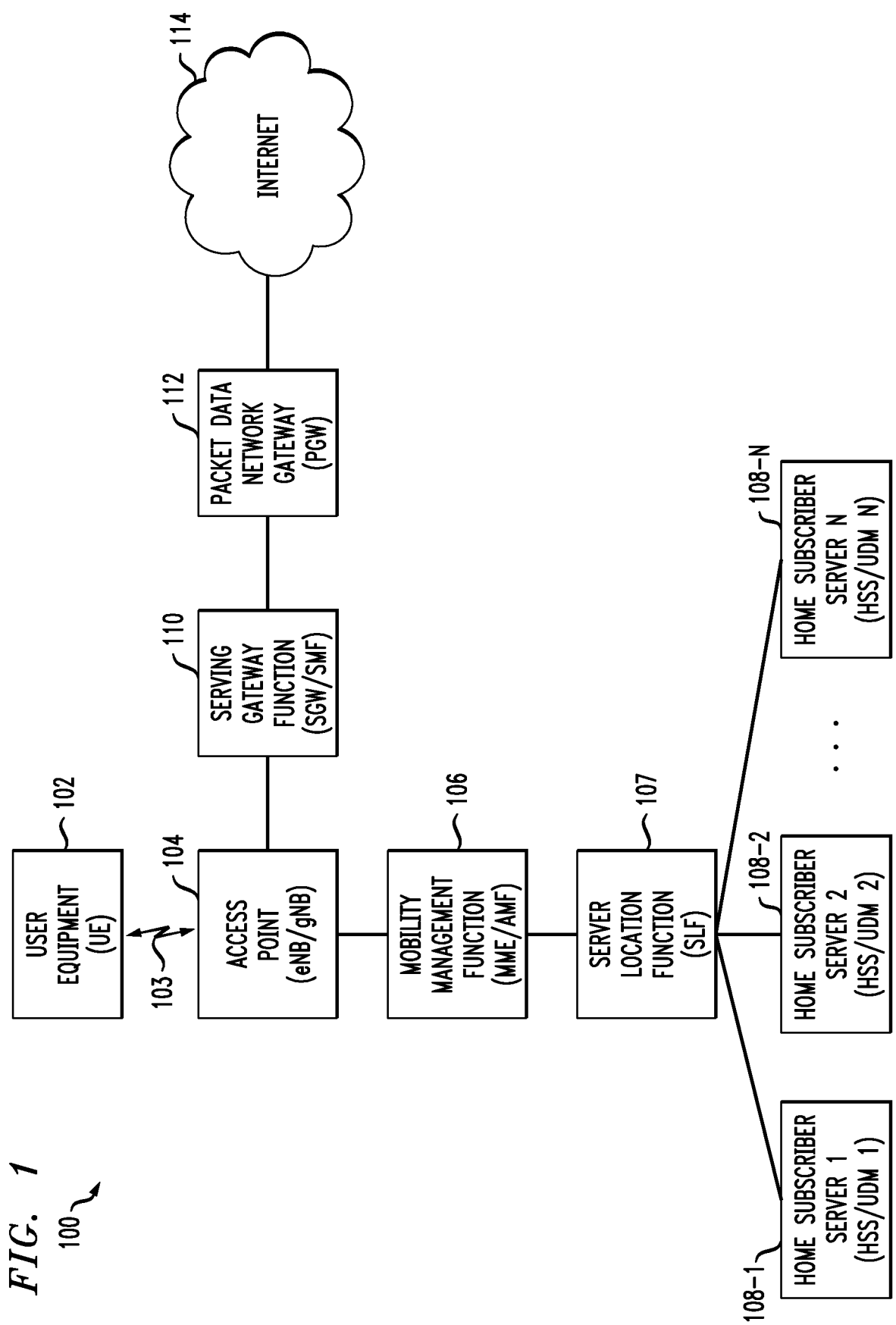
FIG. 1 shows a communication system in an illustrative embodiment.

Embodiments will be illustrated herein in conjunction with example communication systems and associated techniques for managing authentication requests in a manner which protects the privacy of the user's subscription identity. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as an LTE Evolved Packet Core (EPC) and a 3GPP next generation system (5G), the disclosed embodiments can be adapted in a straightforward manner to a variety of other types of communication systems including, but not limited to, WiMAX systems and Wi-Fi systems.

As mentioned above, privacy of subscription identifiers when communicating over the air interface between the user equipment and the network access point has been a significant issue for 2G/3G/4G networks. Efforts have been made in 5G networks to address this significant issue. Even if it is unavoidable that down bidding attacks (e.g., an attacker impersonates the user equipment to negotiate an inferior security capability with the network access point) may force a 5G UE to attach to a lower generation network, it is realized that there is a need to address these privacy demands.

The above-referenced TR 33.899 describes several solutions to provide privacy over the air interface that can be generally grouped in three solution classes:

1) pseudonym solutions based on symmetric cryptographic systems, which demand a home subscriber server/function of the UE's home network to map a changing pseudonym to the permanent subscription identifier of the UE;

2) encryption of the permanent subscription identifier of the UE using the public key of the home network operator; and 3) encryption of the permanent subscription identifier of the UE using the public key of the serving network operator.

Note that, in one example, an International Mobile Subscriber Identity (IMSI) is a permanent subscription identifier (subscriber identity) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN).

Note also that in an LTE network, the home subscriber server/function is called a Home Subscriber Server (HSS), and in a 5G network it is called User Data Management (UDM) which may also comprise an Authentication and Security Function (AUSF) and an Authentication Credential Repository and Processing Function (ARPF) as part of the UDM function.

While some illustrative embodiments are described herein from the perspective of the second solution class (i.e., the home network public key based solution), alternative embodiments may be implemented for the other two solution classes. See SA2 TS 23.502 and SA3 TR 33.899, the disclosures of which are incorporated by reference herein in their entireties.

In the home network public key based solution, the home operator provides its public key to all home network subscribers. They will use it to encrypt the subscriber identity, which is, by way of example, the MSIN part of IMSI. Only the MSIN part needs to be encrypted, because MNC+MCC is needed by the serving network to route to the correct home network. Only the home HSS can decrypt the message because it possesses the private key that corresponds to the public key. Once the IMSI is identified, HSS/AuC (where AuC is the Authentication Center part of the HSS) will create authentication vectors (AVs) based on the distinct shared root key K between a user (subscriber) and the HSS/AuC. Similarly, in the 5G network, the UDM/ARPF creates the AV's requested via AUSF. AUSF and UDM could be co-located for optimization reasons.

An operator in his network may have implementations of multiple HSSs which allows him to manage distinct sets of users in different HSSs/UDMs. Because of the multiple HSSs, a Server Location Function (SLF) may be implemented in front of a set of HSSs. Note that SLF may also be referred to as a Subscriber Location Function. The SLF analyzes the authentication request for a user received from the MME/AMF and routes it to the correct HSS.

By way of example only, operation of the SLF is described in 3GPP TS 29.272 (Section 8: "User identity to HSS resolution") entitled "3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 14)," the disclosure of which is incorporated by reference herein in its entirety. The SLF provides user identity (IMSI)-to-HSS resolution using a locally maintained subscriber profile database and routes the Diameter messages containing the user authentication requests, as a Diameter proxy to the chosen HSS. Note that, in 5G, similar functionality would also be requested if 5G core network protocols are different from Diameter, e.g., using httpproxies. In the following descriptions, it is assumed that the SLF is covering both the DRA (Diameter Routing Agent) based solution as per 4G or any other proxy related solution dependent on protocol decisions for the 5G core network.

It is realized herein that if the home operator uses an SLF to split its set of subscribers, the SLF would need to evaluate the received identifier first. Thus, in a 5G network with permanent subscriber identity (e.g., IMSI) encrypted by one of the methods, an SLF would need to take over the decryption of the MSIN part of the IMSI. Further, the SLF would need to keep a database of all subscribers' profiles with the routing information, i.e., a profile should map a subscriber's permanent identity (e.g., IMSI) to one of the HSSs in the network to forward the Authentication Request after decrypting the received (encrypted) IMSI. Therefore, it is advantageous to perform the decryption of the encrypted IMSI at the SLF instead of in the HSS. Hence, instead of an HSS storing the private key, now the SLF would need to store and use the network private key. An SLF is placed in the home operator's domain and considered trusted. In general, an SLF could be assumed in a large operator network. The usage of an SLF simplifies the new privacy management for the HSS/UDM in 5G networks up to the point that HSS/UDM is not changed at all for the protection of subscription identifiers over the air interface, but the SLF needs to perform the additional functionality of encrypted IMSI decryption and then perform the IMSI-to-HSS resolution.

Accordingly, illustrative embodiments as described herein address the issue of how the HSS/UDM or the SLF can efficiently deal with newly introduced privacy features, i.e., that the received attach request first needs to be decrypted. If this is not taken care of, the HSS/UDM or SLF would receive a request and attempt to process it wasting unnecessary computing resources.

Privacy will depend on country specific regulation, therefore HSS/UDM or SLF would need to be implemented to handle both cases of a request for authentication vectors, i.e., to process or forward a "normal" attach request if the 5G UE has not applied privacy or to process a "privacy" attach request.

In a first illustrative embodiment, the 5G UE, if it wants to protect its privacy, adds an identity privacy flag (i.e., privacy indicator) to indicate that the MSIN is provided in encrypted form.

It is to be appreciated that the privacy indicator, in addition to being an "explicit" privacy indicator such as a flag or field, can alternatively be an "implicit" privacy indicator. By implicit privacy indicator, it is meant that the privacy feature is conveyed by the UE to a network element/ function via the algorithm used to encrypt the message. Thus, the network element/function receiving the message from the UE is informed of the privacy feature by the fact that the message is encrypted with a particular encryption algorithm. This also applies to a null-encryption scheme. In a null-encryption scheme, the input equals the output, and the SUPI (Subscription Permanent Identifier of the UE) is unencrypted, i.e., a format-preserved scheme. One could interpret this as the SUPI (or IMSI) is always encrypted, but if no privacy is "switched on," then the null-encryption is used. Thus, the privacy indicator would implicitly reside in the algorithm scheme used (e.g., null-encryption or an algorithm that actually encrypts a message).

It could be suggested that the HSS or SLF, even without this privacy indicator, will figure out after the first attempt to solve the request and, if encrypted, to attempt the decryption. But one key reason to have such an indication specified is that this saves processing time and fewer resources are needed. Thus, in this first illustrative embodiment, the SLF can make the decision on the processing by looking at this flag. If not set, the SLF will assume the provided IMSI is unencrypted, will do the IMSI-to-HSS resolution, and will forward to the correct HSS/UDM, i.e., compatibility with 4G operation is maintained. If the flag is set, the SLF will recognize that the provided IMSI is encrypted and use the network private key to decrypt the MSIN part to form the real unencrypted IMSI, perform the IMSI-to-HSS resolution and then forward the Authentication Request to the correct HSS/UDM. If no SLF is used, the same principle can be used by the HSS/UDM. That is, HSS/UDM has to check whether the 5G UE has set a flag and then decide whether decryption is needed.

This first illustrative embodiment can be applied to a 5G UE attaching via a 5G RAN (Radio Access Network) to a 5G core network (CN). However, 3GPP has identified, as the immediate deployment scenario, that the 5G UE should attach via a 5G RAN to a 4G CN. If the UE sets the indicator, the 4G CN would need to be enhanced to understand the identity privacy flag or other privacy indicator.

From a network architecture perspective for the operator with an evolving 4G network to 5G, both 4G and 5G access and core networks need to be supported for a considerable time. This means that current 4G HSS needs to be supported while supporting new 5G HSS functions of decrypting an encrypted MSIN. In accordance with embodiments, placing an SLF capable of identifying an encrypted MSIN and decrypting it before routing the authentication request to an HSS helps to manage the coexistence of 4G and 5G core in an operator network. Enhancing the SLF to support the new identity 5G privacy feature is more advantageous than enhancing the HSS. If the HSS is enhanced, then in a large network with multiple HSSs, all the HSSs need to be updated together with capability to decrypt an encrypted IMSI. This may be more tedious to handle compared to solving the problem in a single central node (e.g., the SLF). Advantageously, with the first illustrative embodiment, a bidding down attack in 5G (to 4G) would not be beneficial if the same feature is also deployed in 4G whereby an enhanced SLF is used to achieve this feature.

In a second illustrative embodiment, another privacy indicator is provided that the operator could decide to add, e.g., to the network Master Information Block (MIB)/System Information Block (SIB) broadcast, to indicate to the 5G UE that the network will be able to handle a privacy-protected identifier, e.g., a flag that indicates that privacy is expected, possible to process, or desired. It is then up to the 5G UE implemented/configured policy, whether to attach at all to a network, if this indicator is not sent. The indicator on the 4G/5G network side would be to indicate regulation needs per country/region, i.e., switch on/off privacy. Note, while the UE is roaming in a visiting network, even though the UE authentication request from the visiting network is forwarded to the home network, for which the identity privacy indicator (first illustrative embodiment above) is described, there is a need to make adaptations to the serving network as well. The MME/SEAF (SEAF is a Security Anchor Function) has to handle the enhanced initial attach message from the UE, form the UE Authentication Request message, and route it to the home network for requesting the AV. If the subscription identifier is encrypted, the size of the message field for the encrypted IMSI may be different from today's 4G IMSI field (depending on the solution class chosen).

Note that the visiting network can also indicate its availability and, if applicable, its non-usage of privacy. This information can be broadcast, for example, as part of the SIB or other information block, or sent as an explicit request message to each UE.

In a third illustrative embodiment, the UE is configured to manage a privacy indicator that can be set to prohibit a 5G UE from responding to IMSI paging. Thus, if the UE wants to attach to the network and the network requests its real identity, a privacy-configured 5G UE configured with this privacy indicator would not answer.

Given the above-described privacy indicators, a wide variety of network configurations can be employed to implement the privacy indicators. FIGS. 1-7 depict some of these network configurations. However, it is to be appreciated that embodiments are not limited to the network configurations illustrated herein or otherwise described below. FIG. 1 shows a communication system 100 within which illustrative embodiments are implemented. It is to be understood that the elements shown in communication system 100 are intended to represent main functions provided within the system, e.g., UE access functions, mobility management functions, serving gateway functions, etc. As such, the blocks shown in FIG. 1 reference specific elements in LTE and 5G networks that provide the main functions. However, other network elements may be used to implement some or all of the main functions represented. Also, it is to be understood that not all functions of an LTE or 5G network are depicted in FIG. 1. Rather, functions that facilitate an explanation of illustrative embodiments are represented.

Accordingly, as shown, communication system 100 comprises user equipment (UE) 102 that communicates via an air interface 103 with an access point (eNB/gNB) 104. The UE 102 may be a mobile station, and such a mobile station may comprise, by way of example, a mobile telephone, a computer, or any other type of communication device. In an LTE-V2X implementation, one or more UEs may be deployed in a given vehicle. The term "user equipment" as used herein is therefore intended to be construed broadly, so as to encompass a variety of different types of mobile stations, subscriber stations or, more generally, communication devices, including examples such as a combination of a data card inserted in a laptop or other equipment (e.g., a vehicle). Such communication devices are also intended to encompass devices commonly referred to as access terminals.

In one embodiment, UE 102 is comprised of a Universal Integrated Circuit Card (UICC) and Mobile Equipment (ME). The UICC is the user-dependent part of the UE and contains at least one Universal Subscriber Identity Module (USIM) and appropriate application software. The USIM securely stores the International Mobile Subscriber Identity (IMSI) number and its related key, which are used to identify and authenticate subscribers to access networks. The ME is the user-independent part of the UE and contains terminal equipment (TE) functions and various mobile termination (MT) functions.

The access point 104 is illustratively part of an access network of the communication system 100. Such an access network may comprise, for example, an E-UTRAN or 5G System (or mixed) having a plurality of base stations and one or more associated radio network control functions. The base stations and radio network control functions may be logically separate entities, but in a given embodiment may be implemented in the same physical network element, such as, for example, a base station router or femto cellular access point.

The access point 104 in this illustrative embodiment is operatively coupled to a mobility management function 106. In an LTE network, the function is typically implemented by a Mobility Management Element (MME), while in a 5G network, the function is implemented by an Access and Mobility Management Function (AMF). Although not expressly shown, SEAF can be implemented with the AMF connecting a UE with the mobility management. A mobility management function, as used herein, is the element or function in the CN part of the communication system that manages, among other network operations, access and authentication operations with the UE (through the access point 104).

The MME/AMF 106 in this illustrative embodiment is operatively coupled to an SLF 107. In illustrative embodiments, SLF 107 is configured as described above to respond to one or more privacy indicators that are set in messages it receives. As described above, SLF 107 may decrypt a subscriber identity or simply forward the encrypted information to the appropriate home network of UE 102, depending on the one or more privacy indicators. Thus, as shown, SLF 107 is operatively coupled to a plurality of HSSs/UDMs 108-1, 108-2, . . . , 108-N. These HSSs/UDMs represent the home networks of UEs that may attach to the communication system 100. SLF 107 is configured to provide the UE information to the appropriate HSS/UDM 108.

The access point 104 is also operatively coupled to a serving gateway function 110 (e.g., Serving Gateway (SGW) in an LTE network, and Session Management Function (SMF) in a 5G network), which is operatively coupled to a Packet Data Network (PDN) Gateway (PGW) 112. PGW 112 is operatively coupled to a Packet Data Network, e.g., Internet 114. MME/AMF 106 and SLF 107 may be considered part of a CN. MME/AMF 106 and SLF 107 can also be part of a serving network. Further typical operations and functions of such network elements are not described here since they are not the focus of the illustrative embodiments and may be found in appropriate 3GPP LTE or 5G documentation.

It is to be appreciated that this particular arrangement of system elements is an example only, and other types and arrangements of additional or alternative elements can be used to implement a communication system in other embodiments. For example, in other embodiments, the system 100 may comprise authentication elements, as well as other elements not expressly shown herein.

Accordingly, the FIG. 1 arrangement is just one example configuration of a wireless cellular system, and numerous alternative configurations of system elements may be used. For example, although only single UE, eNB/gNB, MME/AMF, SLF, SGW/SMF and PGW elements are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of function sets (i.e., function chains) for each corresponding service type using network function virtualization (NFV) on a common physical infrastructure. The network slices are instantiated as needed for a given service, e.g., eMBB service, massive IoT service (e.g., V2X service), and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via eNB/gNB 104.

Figure 2:
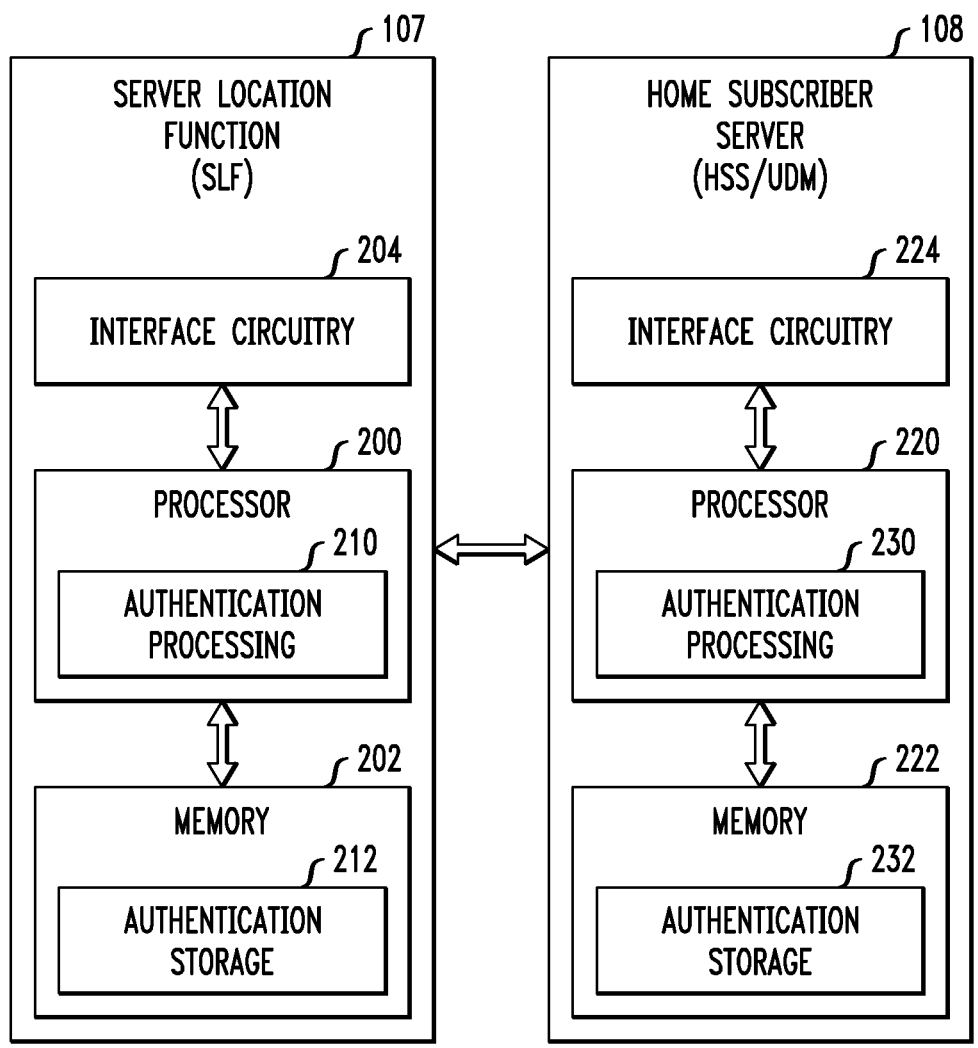
FIG. 2 shows a more detailed view of a server location function and a home subscriber server in an illustrative embodiment.

FIG. 2 shows a more detailed view of SLF 107 and one HSS/UDM 108 in an illustrative embodiment. Each HSS/UDM 108 (108-1, 108-2, . . . , 108-N) in FIG. 1 can be configured as shown in FIG. 2. The SLF 107 comprises a processor 200 coupled to a memory 202 and interface circuitry 204. The processor 200 of the SLF 107 includes an authentication processing module 210 that may be implemented at least in part in the form of software executed by the processor 200. The authentication processing module 210 performs authentication operations of the processes described in conjunction with subsequent figures and otherwise herein. The memory 202 of the SLF 107 includes an authentication storage module 212 that stores authentication and related data generated or otherwise used during authentication operations.

The HSS/UDM 108 comprises a processor 220 coupled to a memory 222 and interface circuitry 224. The processor 220 of the HSS/UDM 108 includes an authentication processing module 230 that may be implemented at least in part in the form of software executed by the processor 220. The authentication processing module 230 performs the authentication operations of the processes described in conjunction with subsequent figures and otherwise herein. The memory 222 of the HSS/UDM 108 includes an authentication storage module 232 that stores authentication and related data generated or otherwise used during authentication operations.

The processors 200 and 220 of the respective SLF 107 and HSS/UDM 108 may comprise, for example, microprocessors, application-specific integrated circuits (ASICs), digital signal processors (DSPs) or other types of processing devices, as well as portions or combinations of such elements.

The memories 202 and 222 of the respective SLF 107 and HSS/UDM 108 may be used to store one or more software programs that are executed by the respective processors 200 and 220 to implement at least a portion of the functionality described herein. For example, authentication operations and other functionality as described in conjunction with subsequent figures and otherwise herein may be implemented in a straightforward manner using software code executed by processors 200 and 220.

A given one of the memories 202 or 222 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 202 or 222 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 204 and 224 of the respective SLF 107 and HSS/UDM 108 illustratively comprise transceivers or other communication hardware or firmware that allows the associated system elements to communicate with one another in the manner described herein.

It is apparent from FIG. 2 that SLF 107 is configured for communication with HSS/UDM 108 and vice-versa via their respective interface circuitries 204 and 224. This communication involves SLF 107 sending data to the HSS/UDM 108, and the HSS/UDM 108 sending data to the SLF 107. However, in alternative embodiments, other network elements may be operatively coupled between the SLF and the HSS/UDM. The term "data" as used herein is intended to be construed broadly, so as to encompass any type of information that may be sent between user equipment and a core network via a base station element including, but not limited to, identity data, authentication data, control data, audio, video, multimedia, etc.

It is to be appreciated that the particular arrangement of components shown in FIG. 2 is an example only, and numerous alternative configurations may be used in other embodiments. For example, the user equipment and mobility management function can be configured to incorporate additional or alternative components and to support other communication protocols.

Other system elements, such as UE 102, eNB/gNB 104, MME/AMF 106, SGW/SMF 110, and PGW 112, may each also be configured to include components such as a processor, memory and network interface. These elements need not be implemented on separate standalone processing platforms, but could instead, for example, represent different functional portions of a single common processing platform. Such a processing platform may additionally comprise at least portions of an eNB/gNB and an associated radio network control function.

FIGS. 3-7 illustrate message flows and network configurations within which one or more of the above-described privacy indicators can be implemented. These message flows and network configurations are understood to be illustrative embodiments.

Figure 3:
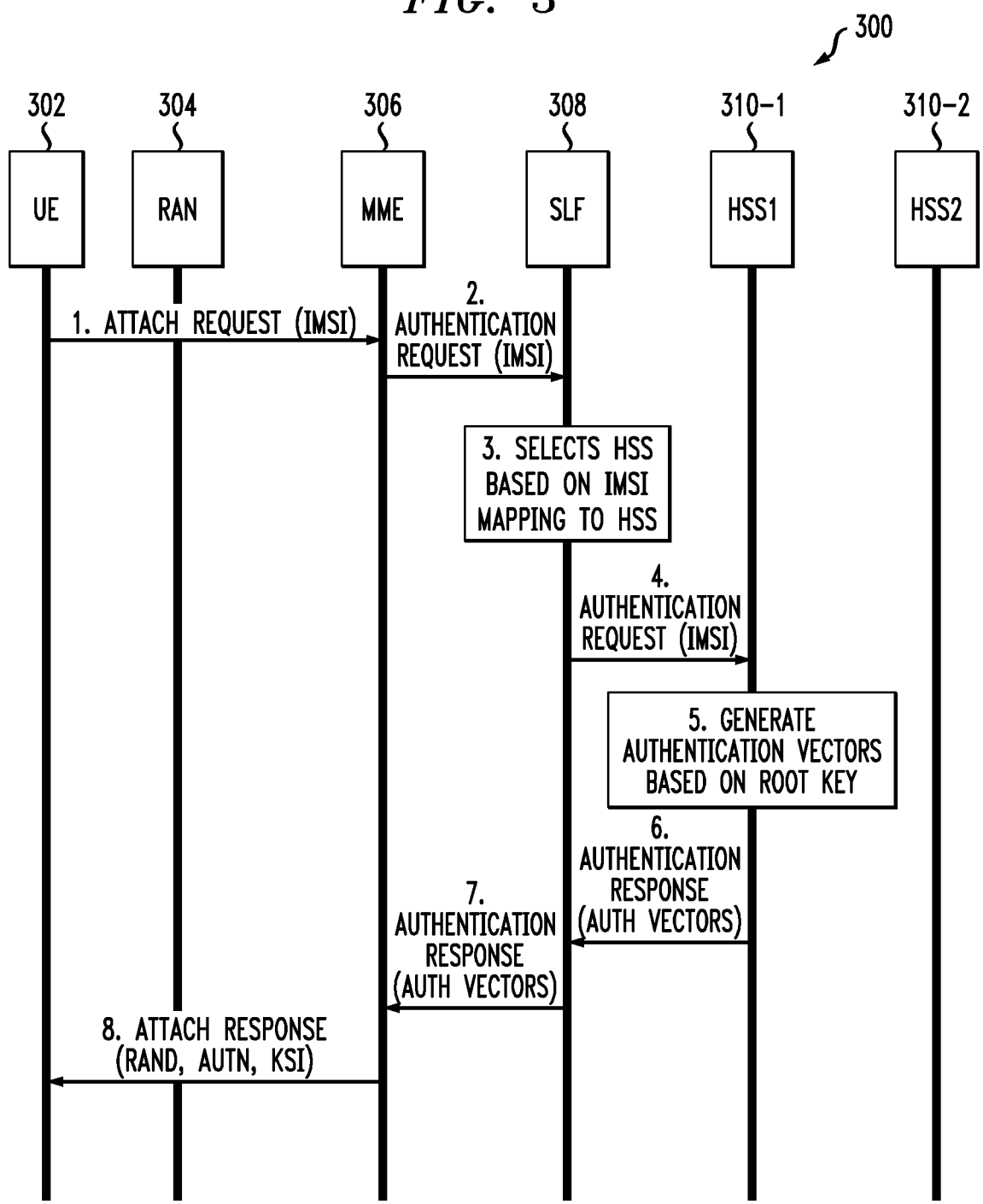
FIG. 3 shows a message flow for a user equipment authentication procedure for an LTE network in an illustrative embodiment.

FIG. 3 illustrates a high-level UE authentication procedure 300 in LTE using unencrypted IMSI, SLF and multiple HSS, in accordance with one illustrative embodiment.

More particularly, FIG. 3 shows UE 302, RAN 304, MME 306, SLF 308, HSS1 310-1 and HSS2 310-2. Although only two HSSs are depicted, any number of HSS may be implemented in accordance with the embodiments described herein. In step 1 of the UE authentication procedure flow of FIG. 3, UE 302 sends an attach request (IMSI) through RAN 304 to MME 306. In step 2, MME 306 then sends an authentication request (IMSI) to SLF 308. In step 3, SLF 308 selects an HSS based on IMSI mapping to HSS. In step 4, SLF 308 sends the authentication request (IMSI) to the selected HSS, which as indicated in FIG. 3, is HSS1 310-1. In step 5, HSS1 310-1 generates authentication vectors (AVs) based on a root key. In step 6, HSS1 310-1 sends an authentication response (AVs) to SLF 308, and in step 7, SLF 308 sends the authentication response (AVs) to MME 306. The authentication response may comprise a random challenge (RAND), an authentication token (AUTN) and a key set identifier (KSI). In step 9, MME 306 sends an attach response to UE 302 through RAN 304.

Figure 4:
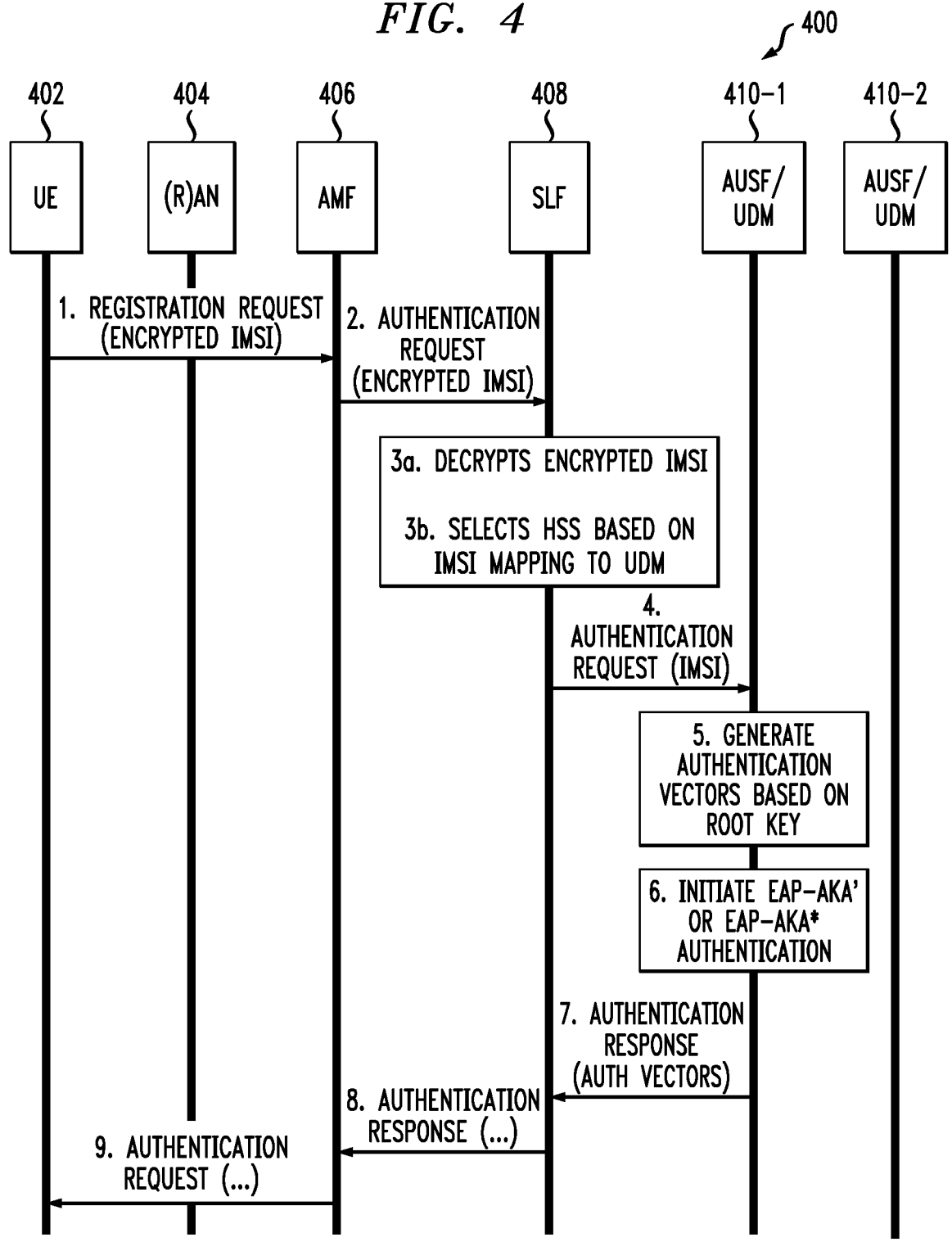
FIG. 4 shows a message flow for a user equipment authentication procedure for a 5G network in an illustrative embodiment.

FIG. 4 illustrates a high-level UE authentication procedure 400 in 5G using encrypted IMSI, SLF and multiple UDM. Performing the IMSI decryption at the SLF instead of the UDM helps to maintain the core authentication functions unchanged, in accordance with one illustrative embodiment. As used herein, the acronym EAP refers to Extensible Authentication Protocol, and the acronym AKA refers to Authentication and Key Agreement.

More particularly, FIG. 4 shows UE 402, (R)AN 404, AMF 406, SLF 408, AUSF/UDM 410-1 and AUSF/UDM 410-2. Although only two AUSF/UDMs are depicted, any number of AUSF/UDMs may be implemented in accordance with the embodiments described herein. In step 1 of the UE authentication procedure flow of FIG. 4, UE 402 sends a registration request (encrypted IMSI) through (R)AN 404 to AMF 406. Note that by referring to encrypted IMSI, this can refer to the portion of the IMSI that is typically encrypted, e.g., MSIN, or all or other parts of IMSI. In step 2, AMF 406 sends an authentication request (encrypted IMSI) to SLF 408. Step 3 includes sub-steps 3a and 3b. In step 3a, SLF 408 decrypts the encrypted IMSI. In one embodiment, SLF 408 decrypts the encrypted IMSI using a provisioned certificate. In step 3b, SLF 408 selects an HSS based on IMSI mapping to UDM. In step 4, SLF 408 sends the authentication request (IMSI) to the selected UDM, which as indicated in FIG. 4, is AUSF/UDM 410-1. In step 5, AUSF/UDM 410-1 generates authentication vectors (AVs) based on a root key. In step 6, AUSF/UDM 410-1 initiates EAP AKA' authentication or EAP AKA* authentication (AKA* refers to AKA with increased home control). In step 7, AUSF/UDM 410-1 sends an authentication response (AVs) to SLF 408, and in step 8, SLF 408 sends the authentication response (AVs) to AMF 406. In step 9, AMF 406 sends an authentication request to UE 402 through (R)AN 404.

Figure 5:
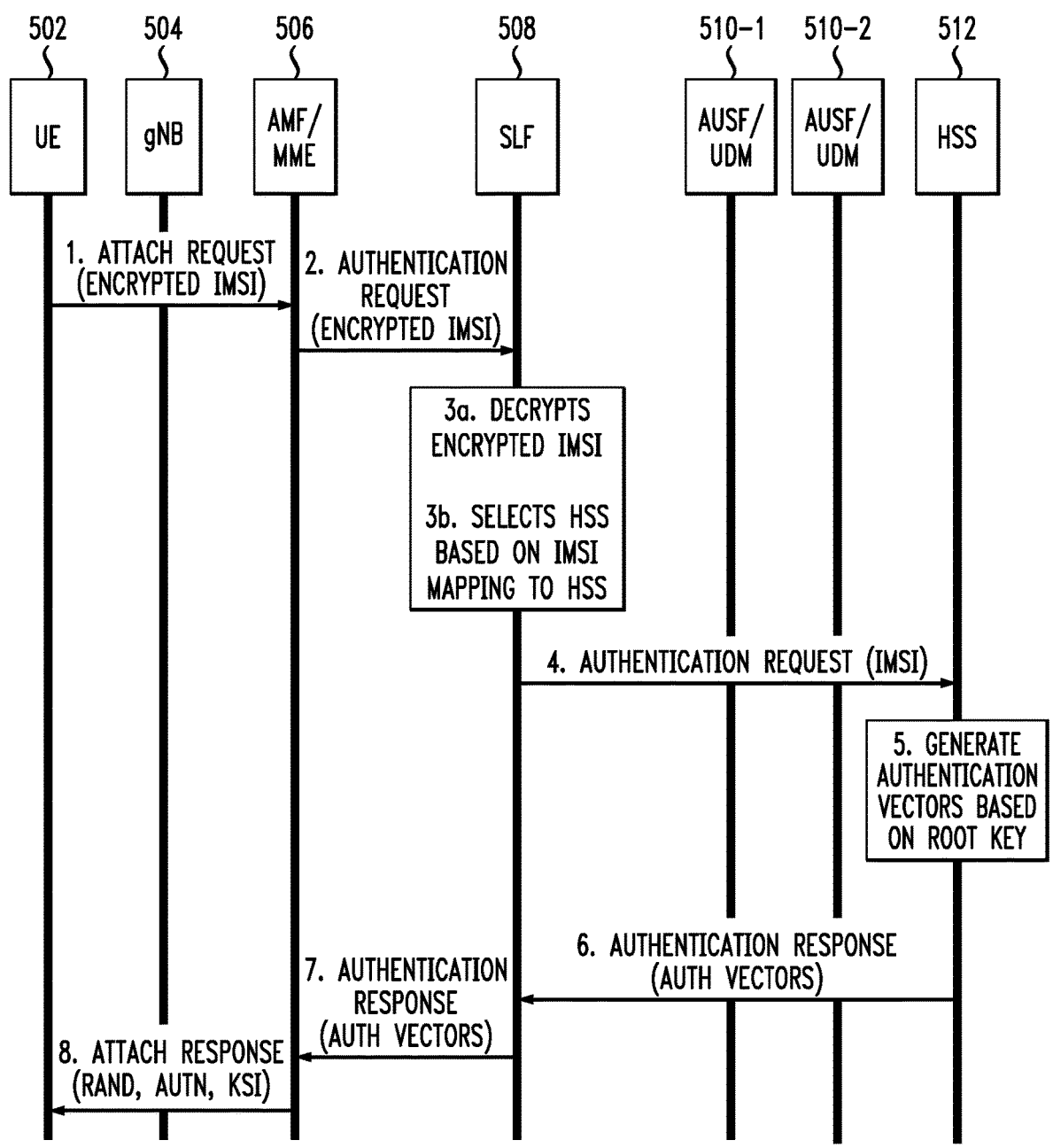
FIG. 5 shows a message flow for a user equipment authentication procedure for a mixed LTE/5G network in an illustrative embodiment.

FIG. 5 illustrates a procedure 500 for a mixed core architecture of UDM and HSS to support 4G LTE and 5G networks, in accordance with one illustrative embodiment. IMSI decryption at SLF helps to manage both cores.

More particularly, FIG. 5 shows UE 502, gNB 504, AMF/MME 506, SLF 508, AUSF/UDMs 510-1 and 510-2, and HSS 512. Although only two AUSF/UDMs are depicted, any number of AUSF/UDMs may be implemented in accordance with the embodiments described herein.

In step 1 of the procedure of FIG. 5, UE 502 sends an attach request (encrypted IMSI) through gNB 504 to AMF/MME 506. Note that by referring to encrypted IMSI, this can refer to the portion of the IMSI that is typically encrypted, e.g., MSIN, or all or other parts of IMSI. In step 2, AMF/MME 506 then sends an authentication request (encrypted IMSI) to SLF 508. Step 3 includes sub-steps 3a and 3b. In step 3a, SLF 508 decrypts the encrypted IMSI. In one embodiment, SLF 508 decrypts the encrypted IMSI using a provisioned certificate. In step 3b, SLF 508 selects an HSS based on IMSI mapping to HSS. In step 4, SLF 508 sends the authentication request (IMSI) to the selected HSS, HSS 512, through AUSF/UDMs 510-1 and 510-2. In step 5, HSS 512 generates authentication vectors (AVs) based on a root key. In step 6, HSS 512 sends an authentication response (AVs) to SLF 508 through AUSF/UDMs 510-1 and 510-2, and in step 7, SLF 508 sends the authentication response (AVs) to AMF/MME 506. In step 8, AMF/MME 506 sends an attach response to UE 502 through gNB 504.

Figure 6:
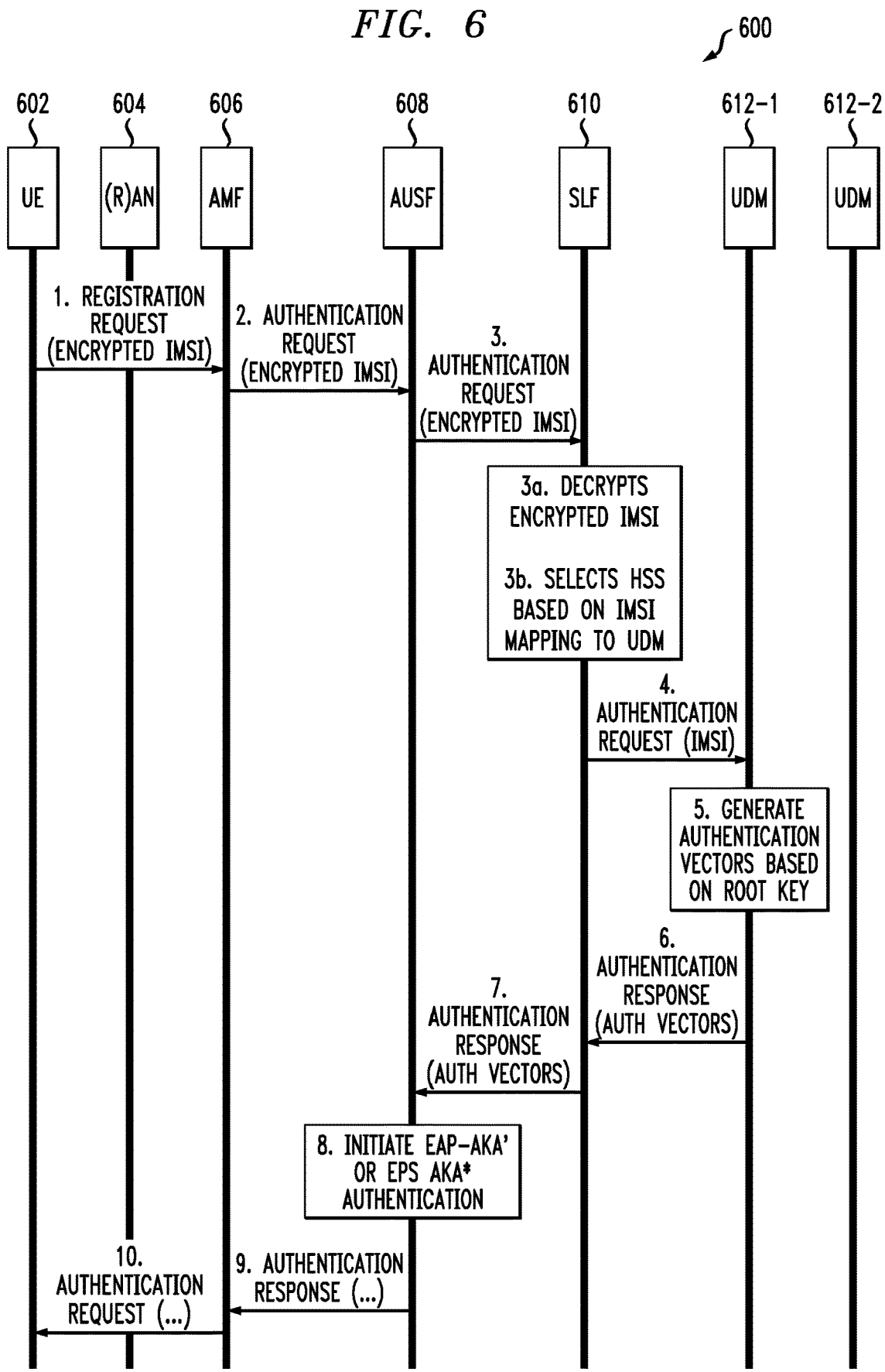
FIG. 6 shows a message flow for a user equipment authentication procedure for a 5G network in another illustrative embodiment.

FIG. 6 illustrates a high-level UE authentication procedure 600 in 5G using encrypted IMSI, SLF and multiple UDM, in accordance with an illustrative embodiment. Performing the IMSI decryption at the SLF instead of the UDM helps to maintain the core authentication functions unchanged.

More particularly, FIG. 6 shows UE 602, (R)AN 604, AMF 606, AUSF 608, SLF 610, and UDMs 612-1 and 612-2. Although only two UDMs are depicted, any number of UDMs may be implemented in accordance with the embodiments described herein. In step 1 of the high-level UE authentication procedure flow of FIG. 6, UE 602 sends a registration request (encrypted IMSI) through (R)AN 604 to AMF 606. Note that by referring to encrypted IMSI, this can refer to the portion of the IMSI that is typically encrypted, e.g., MSIN, or all or other parts of IMSI. In step 2, AMF 606 then sends an authentication request (encrypted IMSI) to AUSF 608. In step 3, AUSF 608 sends the authentication request (encrypted IMSI) to SLF 610. In step 3a, SLF 610 decrypts the encrypted IMSI. In one embodiment, SLF 610 decrypts the encrypted IMSI using a provisioned certificate. In step 3b, SLF 610 selects an HSS based on IMSI mapping to UDM. In step 4, SLF 610 sends the authentication request (IMSI) to the selected UDM, which as indicated in FIG. 6 is UDM 612-1. In step 5, UDM 612-1 generates authentication vectors (AVs) based on a root key. In step 6, UDM 612-1 sends an authentication response (AVs) to SLF 610, and in step 7, SLF 610 sends the authentication response (AVs) to AUSF 608. In step 8, AUSF 608 initiates EAP AKA' authentication or EAP AKA* authentication. In step 9, AUSF 608 sends the authentication response to AMF 606. In step 10, AMF 606 sends an authentication request to UE 602 through (R)AN 604.

Figure 7:
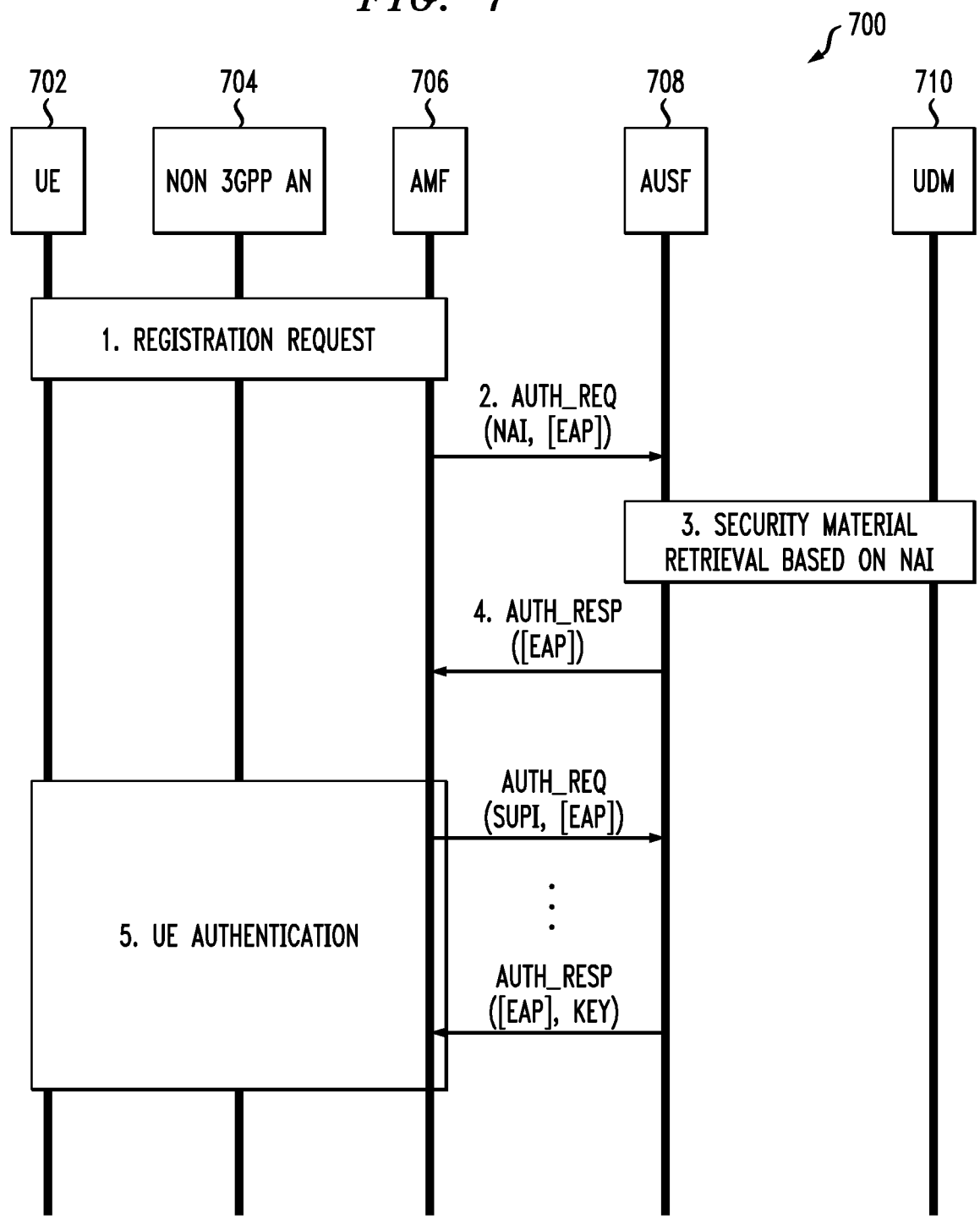
FIG. 7 shows a message flow for a user equipment accessing a 5G network via non-3GPP access and authentication in an illustrative embodiment.

FIG. 7 illustrates a procedure 700 for a UE accessing the 5G network via non-3GPP access (WLAN) and authentication, in accordance with an illustrative embodiment. As used herein, the acronym AN refers access network, the acronym NAI refers to Network Access Identifier and the acronym SUPI refers to the Serialized Unique Product Identifier of the UE.

More particularly, FIG. 7 shows UE 702, Non 3GPP AN 704, AMF 706, AUSF 708 and UDM 710. In step 1 of the procedure of FIG. 7, UE 702 sends a registration request through Non 3GPP AN 704 to AMF 706. In step 2, AMF 706 sends an authentication request (NAI, [EAP]) to AUSF 708. AUSF 708 decides an authentication type (e.g., EAP AKA' authentication or EAP AKA* authentication), and acts as an EAP server and performs EAP AKA' authentication or EAP AKA* authentication. In step 3, security material is retrieved from UDM 710 based on the NAI. In step 4, AUSF 708 send an authentication response ([EAP]) to AMF 706, which initiates UE Authentication at step 5. As shown, during UE Authentication, AMF 706 sends an authentication request (SUPI, [EAP]) to AUSF 708. Several authentication request messages may be required between UE 702 and AUSF 708 (via AMF 706) depending on the chosen EAP authentication method. Upon successful UE authentication, AUSF 708 sends AMF 706 an authentication response ([EAP], Key). The Key is a security key that may be used by AMF 706 to generate Non-Access Stratum (NAS), Control Plane (CP) and User Plane (UP) specific security keys.

Techniques discussed herein provide one or more privacy indicators for authentication requests in communication systems. For example, such privacy indicators can be controlled (e.g., set) by using one or more bits in an information element or flag that is transmitted to elements of a communication system. Furthermore, methods and mechanisms are provided that address how the home network of user equipment and other elements/functions in the core network (e.g., a server location function) can efficiently process the one or more privacy indicators. Advantageously, the one or more privacy indicators save wasted computing resources in the one or more network configurations in which they are implemented.

It is to be appreciated that the naming of identifiers mentioned herein, e.g., IMSI, etc., are for illustrative purposes only. That is, an identifier for a UE may have different names or acronyms in different protocols and standards for different communication network technologies. As such, none of the specific names or acronyms given to these identifiers herein are intended to limit embodiments in any manner.

As indicated previously, the embodiments are not limited to the LTE or 5G context and the disclosed techniques can be adapted in a straightforward manner to a wide variety of other communication system contexts including, but not limited to, other 3GPP systems and non-3GPP systems which employ identity (e.g., IMSI or equivalent) in the identity request process.

The processor, memory, controller and other components of a user equipment or base station element of a communication system as disclosed herein may include well-known circuitry suitably modified to implement at least a portion of the identity request functionality described above.

As mentioned above, embodiments may be implemented in the form of articles of manufacture each comprising one or more software programs that are executed by processing circuitry of user equipment, base stations or other elements of a communication system. Conventional aspects of such circuitry are well known to those skilled in the art and therefore will not be described in detail herein. Also, embodiments may be implemented in one or more ASICS, FPGAs or other types of integrated circuit devices, in any combination. Such integrated circuit devices, as well as portions or combinations thereof, are examples of "circuitry" as that term is used herein. A wide variety of other arrangements of hardware and associated software or firmware may be used in implementing the illustrative embodiments.

It should therefore again be emphasized that the various embodiments described herein are presented by way of illustrative example only, and should not be construed as limiting the scope of the claims. For example, alternative embodiments can utilize different communication system configurations, user equipment configurations, base station configurations, identity request processes, messaging protocols and message formats than those described above in the context of the illustrative embodiments. These and numerous other alternative embodiments within the scope of the appended claims will be readily apparent to those skilled in the art.

What is claimed is:

1. A method comprising:
   determining, at a network entity in a communication network, one or more privacy features supported by the communication network, the one or more privacy features comprising an indication of whether the communication network is configured to handle privacy-protected subscription identifiers;
   generating, at the network entity in the communication network, a System Information Message comprising a Master Information Block or a System Information Block, the System Information Message further comprising one or more privacy indicators selected based on the determined one or more privacy features, the one or more privacy indicators comprising a field indicating whether the communication network is configured to handle the privacy-protected subscription identifiers;
   sending, from the network entity, to the plurality of user equipment, the System Information Message comprising the one or more privacy indicators;
   receiving, in response to the System Information Message, at the network entity, from at least a portion of the plurality of user equipment, one or more registration requests comprising respective privacy-protected subscription identifiers;
   processing the one or more registration requests to determine respective subscription identifiers; and
   identifying one or more Home Subscriber Servers (HSS) or one or more User Data Management (UDM) functions to which to provide the one or more registration requests.

2. An apparatus comprising:
   a processor; and
   a memory, wherein the processor is operatively coupled to the memory and configured to at least:
   determine, at the apparatus in a communication network, one or more privacy features supported by the communication network, the one or more privacy features comprising an indication of whether the network entity is configured to handle privacy-protected subscription identifiers;
   generate, at the apparatus in the communication network, a System Information Message comprising a Master Information Block or a System Information Block, the System Information Message further comprising one or more privacy indicators selected based on the determined one or more privacy features, the one or more privacy indicators comprising a field indicating whether the communication network is configured to handle the privacy-protected subscription identifiers;
   send, from the apparatus in the communication network to the plurality of user equipment of the communication network, the System Information Message comprising the one or more privacy indicators;
   receive, in response to the System Information Message, at the apparatus, from at least a portion of the plurality of user equipment, one or more registration requests comprising respective privacy-protected subscription identifiers;
   process the one or more registration requests to determine respective subscription identifiers; and
   identify one or more Home Subscriber Servers (HSS) or one or more User Data Management (UDM) functions to which to provide the one or more registration requests.

3. A non-transitory processor-readable storage medium having embodied therein executable program code that when executed by a processor causes the processor to at least:
   determine, at a network entity in a communication network, one or more privacy features supported by the communication network, the one or more privacy features comprising an indication of whether the network entity is configured to handle privacy-protected subscription identifiers;
   generate, at the network entity in the communication network, a System Information Message comprising a Master Information Block or a System Information Block, the System Information Message further comprising one or more privacy indicators selected based on the determined one or more privacy features, the one or more privacy indicators comprising a field indicating whether the communication network is configured to handle the privacy-protected subscription identifiers;

send, from the network entity in the communication network to the plurality of user equipment of the communication network, the System Information Message comprising the one or more privacy indicators;

receive, in response to the System Information Message, at the network entity, from at least a portion of the plurality of user equipment, one or more registration requests comprising respective privacy-protected subscription identifiers;

process the one or more registration requests to determine respective subscription identifiers; and identify one or more Home Subscriber Servers (HSS) or one or more User Data Management (UDM) functions to which to provide the one or more registration requests.

4. A method comprising:

receiving, from a network entity in a communication network, at user equipment of the communication network, a first message comprising an indication of one or more privacy features of the communication network, wherein the indication of one or more privacy features of the communication network comprises a first field indicating whether the communication network is configured to handle privacy-protected subscription identifiers;

determining, at the user equipment of the communication network, based at least on the indication comprising the first field, the one or more privacy features of the communication network for processing a second message, the second message comprising a registration request and a subscription identifier for a subscriber of the communication network associated with the user equipment;

in an instance in which the first field in the first message indicates that the communication network is not configured to handle privacy-protected subscription identifiers, refraining from privacy protecting the subscription identifier in the second message;

in an instance in which the first field in the first message indicates that the communication network is configured to handle privacy-protected subscription identifiers, privacy-protecting the subscription identifier in the second message;

adding one or more privacy indicators to the second message based on the determined one or more privacy features of the communication network, the one or more privacy indicators comprising a second field indicating whether the subscription identifier in the registration request is privacy-protected, wherein, in an instance in which the second field comprises a first value, the second field indicates that the subscription identifier in the registration request is not privacy-protected, and, in an instance in which the second field comprises a second value, the second field indicates that the subscription identifier in the registration request is privacy-protected; and sending the second message from the user equipment to the network entity in the communication network.

5. A method comprising:

determining, at a user equipment, based on a first message received at the user equipment from a network entity of a communication network, whether the network entity is configured to handle privacy-protected subscription identifiers in registration request messages;

generating, at the user equipment, a second message comprising a registration request, the second message comprising a subscription identifier for a subscriber of the communication network associated with the user equipment;

determining, based on the first message, whether the subscription identifier in the second message is to be privacy protected;

in an instance in which the subscription identifier in the second message is to be privacy protected,
 privacy protecting the subscription identifier in the second message,
 adding, to the second message, two or more privacy indicators comprising a field that indicates whether the subscription identifier in the second message is privacy protected, and
 adding a first value to the field in the second message, the first value indicating that the subscription identifier in the second message is privacy protected;

in an instance in which the subscription identifier in the second message is not to be privacy protected,
 refraining from privacy protecting the subscription identifier in the second message,
 adding, to the second message, the two or more privacy indicators comprising the field that indicates whether the subscription identifier in the second message in the registration request is privacy protected, and
 adding a second value to the field in the second message, the second value indicating that the subscription identifier in the second message is not privacy protected; and sending the second message comprising the registration request from the user equipment to the network entity in the communication network.

6. The method of claim 5, wherein the message is a second message, the method further comprising:

receiving, at the user equipment, from the network entity, a first message comprising an indication of whether the network entity is configured to handle privacy-protected subscription identifiers;

determining, based at least upon the first message, whether the network entity in the communication network is configured for handling privacy-protected subscription identifiers; and determining, based on whether the network entity is configured for handling privacy-protected subscription identifiers, whether the subscription identifier in the second message is to be privacy protected.

7. The method of claim 5, further comprising:

prohibiting the user equipment from responding to a request for a real identity of a subscriber of the communication network associated with the user equipment based on whether the first message indicates that network entity is configured to handle privacy-protected subscription identifiers.

8. The method of claim 7, wherein the request for the real identity of the subscriber comprises an International Mobile Subscriber Identity (IMSI) paging request.

9. The method of claim 1, wherein the network entity in the communication network comprises a Server Location Function (SLF).

10. The method of claim 4, wherein the network entity in the communication network comprises one of a Server Location Function (SLF), a Home Subscriber Server (HSS) and a User Data Management (UDM) function.

11. The method of claim 5, wherein the network entity in the communication network comprises one of a Server Location Function (SLF), a Home Subscriber Server (HSS) and a User Data Management (UDM) function.

12. The method of claim 1, wherein the one or more registration requests comprise a second field indicative of whether the subscription identifiers are privacy protected, wherein:
   in an instance in which the second field comprises a first value, the second field indicates that the subscription identifier in the registration request is not privacy-protected, and
   in an instance in which the second field comprises a second value, the second field indicates that the subscription identifier in the registration request is privacy-protected.

13. The method of claim 4, wherein the privacy-protected subscription identifier comprises at least a portion of a permanent subscription identifier of the subscriber.

14. The method of claim 4, wherein the second field in the second message is operable to indicate to the network entity whether to: a) route the second message directly to a correct recipient entity or b) use a private key to remove privacy protection from the subscription identifier in the second message before routing the second message to the correct recipient entity.

15. A method comprising:
   receiving, at user equipment of a communication network, from a network entity in the communication network, a System Information Message comprising a Master Information Block or a System Information Block, the System Information Message further comprising an indication of whether the network entity requests or requires that subscription identifiers be privacy-protected in registration request messages transmitted to the network entity;
   generating, at the user equipment, a registration request message comprising a registration request and a subscription identifier for a subscriber of the communication network associated with the user equipment;
   in an instance in which the indication in the System Information Message is that the network entity requests or requires that subscription identifiers be privacy-protected in registration request messages to the network entity, privacy protecting the subscription identifier in the registration request message; or
   in an instance in which the indication in the System Information Message is that subscription identifiers in registration request messages to the network entity need not be privacy-protected, refraining from privacy protecting the subscription identifier in the registration request message; and
   transmitting the registration request message towards the network entity in the communication network.

16. An apparatus comprising:
   a processor; and
   a memory, wherein the processor is operatively coupled to the memory and configured to at least:
      receive, from a network entity in a communication network, a System Information Message comprising a Master Information Block or a System Information Block, the System Information Message further comprising an indication of whether the network entity requests or requires that subscription identifiers in registration request messages to the network entity be privacy-protected;
      generate a registration request message comprising a registration request and a subscription identifier for a subscriber of the communication network associated with the apparatus;
      in an instance in which the indication in the System Information Message is that the network entity requests or requires that subscription identifiers be privacy-protected in registration request messages to the network entity, privacy protect the subscription identifier in the registration request message; or
      in an instance in which the System Information Message comprises an indication that subscription identifiers in registration request messages to the network entity need not be privacy-protected, refrain from privacy protecting the subscription identifier in the registration request message; and
      transmit the registration request message towards the network entity in the communication network.

17. A non-transitory processor-readable storage medium having embodied therein executable program code that, when executed by a processor, causes the processor to at least:
   receive, at user equipment of a communication network, from a network entity in the communication network, a System Information Message comprising a Master Information Block or a System Information Block, the System Information Message further comprising an indication of whether the network entity requests or requires that subscription identifiers in registration request messages to the network entity be privacy-protected;
   generate, at the user equipment, a registration request message comprising a registration request and a subscription identifier for a subscriber of the communication network associated with the user equipment;
   in an instance in which the System Information Message comprises an indication that the network entity requests or requires that subscription identifiers in registration request messages to the network entity be privacy-protected, privacy protect the subscription identifier in the registration request message; or
   in an instance in which the System Information Message comprises an indication that subscription identifiers in registration request messages to the network entity need not be privacy-protected, refrain from privacy protecting the subscription identifier in the registration request message; and
   transmit the registration request message towards the network entity in the communication network.

18. A method comprising:
   receiving, at user equipment, from a network entity in a communication network, a first message comprising one or more privacy indicators, the one or more privacy indicators comprising a first field, the first field indicating whether the network entity is configured to handle privacy-protected subscription identifiers;
   determining, in an instance in which the first field in the first message comprises a first value, that the network entity is configured to handle privacy-protected subscription identifiers; or
   determining, in an instance in which the first field in the first message comprises a second value, that the network entity is not configured to handle privacy-protected subscription identifiers;
   generating a second message comprising a registration request and one or more subscription identifiers;

in an instance in which the first field in the first message comprises the first value and indicates that the network entity is configured to handle privacy-protected subscription identifiers, privacy protecting the one or more subscription identifiers in the second message; or in an instance in which the first field in the first message comprises the second value and indicates that the network entity is not configured to handle privacy-protected subscription identifiers, refraining from privacy protecting the one or more subscription identifiers in the second message;

adding, to the second message, a second field, the second field indicating whether the one or more subscription identifiers in the second message are privacy protected; and transmitting, from the user equipment, towards the network entity, the second message comprising the registration request, the one or more subscription identifiers, and the second field indicating whether the one or more subscription identifiers are privacy protected.

19. An apparatus comprising:
a processor; and
a memory, the processor being operatively coupled to the memory and configured to at least:
   receive, from a network entity in a communication network, a first message comprising one or more privacy indicators, the one or more privacy indicators comprising a first field, the first field indicating whether the network entity is configured to handle privacy-protected subscription identifiers;
   determine, in an instance in which the first field in the first message comprises a first value, that the network entity is configured to handle privacy-protected subscription identifiers; or
   determine, in an instance in which the first field in the first message comprises a second value, that the network entity is not configured to handle privacy-protected subscription identifiers;
   generate a second message comprising a registration request and one or more subscription identifiers;
   in an instance in which the first field in the first message indicates that the network entity is configured to handle privacy-protected subscription identifiers, privacy protect the one or more subscription identifiers in the second message; or
   in an instance in which the first field in the first message indicates that the network entity is not configured to handle privacy-protected subscription identifiers, refrain from privacy protecting the one or more subscription identifiers in the second message;
   add, to the second message, a second field that indicates whether the one or more subscription identifiers in the second message are privacy protected; and
   transmit, towards the network entity, the second message comprising the registration request, the one or more subscription identifiers, and the second field indicating whether the one or more subscription identifiers are privacy protected.

20. A non-transitory processor-readable storage medium having embodied therein executable program code that, when executed by a processor, causes the processor to at least:
   receive, at user equipment, from a network entity in a communication network, a first message comprising one or more privacy indicators, the one or more privacy indicators comprising a first field, the first field indicating whether the network entity is configured to handle privacy-protected subscription identifiers;
   determine, in an instance in which the first field in the first message comprises a first value, that the network entity is configured to handle privacy-protected subscription identifiers; or
   determine, in an instance in which the first field in the first message comprises a second value, that the network entity is not configured to handle privacy-protected subscription identifiers;
   generate a second message comprising a registration request and one or more subscription identifiers;
   in an instance in which the first field in the first message indicates that the network entity is configured to handle privacy-protected subscription identifiers, privacy protect the one or more subscription identifiers in the second message; or
   in an instance in which the first field in the first message indicates that the network entity is not configured to handle privacy-protected subscription identifiers, refrain from privacy protecting the one or more subscription identifiers in the second message; and
   transmit, from the user equipment, towards the network entity, the second message comprising the registration request, the one or more subscription identifiers, and the second field indicating whether the one or more subscription identifiers are privacy protected.

21. A method comprising:
determining, at a network entity in a communication network, whether the network entity is configured to handle privacy-protected subscription identifiers;
generating, at the network entity, a System Information Message comprising one or more privacy indicators, the one or more privacy indicators comprising a field, the field comprising a first value if the network entity is configured to handle privacy-protected subscription identifiers or a second value if the network entity is not configured to handle privacy-protected subscription identifiers;
sending, from the network entity, towards user equipment in the communication network, the System Information Message comprising the one or more privacy indicators;
receiving, at the network entity, from a particular user equipment, a registration request comprising a subscription identifier for a subscriber associated with the particular user equipment;
in an instance in which the field in the System Information Message comprises the first value and the subscription identifier in the registration request is privacy-protected, processing the registration request to determine the subscription identifier; and
identifying one or more Home Subscriber Servers (HSS) or one or more User Data Management (UDM) functions to which to provide the registration request; or
in an instance in which the field in the System Information Message comprises the second value and the subscription identifier in the registration request is privacy-protected, providing a registration reject message to the particular user equipment.

22. The method of claim 21, wherein, in an instance in which the field in the System Information Message comprises the first value, the subscription identifier in the registration request is expected by the network entity to be privacy-protected.

23. The method of claim 21, wherein, in an instance in which the field in the System Information Message comprises the second value, the subscription identifier in the registration request is expected by the network entity to be privacy unprotected.

24. An apparatus comprising:
a processor; and
a memory, wherein the processor is operatively coupled to the memory and configured to at least:
determine whether a communication network in which the apparatus operates is configured to handle privacy-protected subscription identifiers from user equipment;
generate a System Information Message comprising one or more privacy indicators, the one or more privacy indicators comprising a field, the field comprising a first value if the communication network is configured to handle privacy-protected subscription identifiers or a second value if the communication network is not configured to handle privacy-protected subscription identifiers;
send, to the user equipment in the communication network, the System Information Message comprising the one or more privacy indicators;
receive, from a particular user equipment, a registration request comprising a subscription identifier for a subscriber associated with the particular user equipment;
in an instance in which the field in the System Information Message comprises the first value and the subscription identifier in the registration request is privacy-protected, process the registration request to determine the subscription identifier for the subscriber associated with the particular user equipment; and
identify one or more Home Subscriber Servers (HSS) or one or more User Data Management (UDM) functions to which to provide the registration request; or
in an instance in which the field in the System Information Message comprises the second value and the subscription identifier in the registration request is privacy-protected, provide a registration reject message to the particular user equipment.

25. The apparatus of claim 24, wherein, in an instance in which the field in the System Information Message comprises the first value, the apparatus is configured to expect the subscription identifier in the registration request to be privacy-protected.

26. The apparatus of claim 24, wherein, in an instance in which the field in the System Information Message comprises the second value, the apparatus is configured to expect the subscription identifier in the registration requests to be privacy unprotected.

27. A non-transitory processor-readable storage medium having embodied therein executable program code that when executed by a processor causes the processor to at least:
determine, at a network entity in a communication network, whether the communication network is configured to handle privacy-protected subscription identifiers;
generate, at the network entity, a System Information Message comprising one or more privacy indicators, the one or more privacy indicators comprising a field, the field comprising a first value if the communication network is configured to handle privacy-protected subscription identifiers or a second value if the communication network is not configured to handle privacy-protected subscription identifiers;
transmit, towards user equipment in the communication network, the System Information Message comprising the one or more privacy indicators;
receive, at the network entity, from a particular user equipment, a registration request comprising a subscription identifier for a subscriber associated with the particular user equipment;
in an instance in which the field in the System Information Message comprises the first value and the subscription identifier in the registration request from the particular user equipment is privacy-protected, process the registration request to determine respective the subscription identifier; and
identify one or more Home Subscriber Servers (HSS) or one or more User Data Management (UDM) functions to which to provide the registration request; or
in an instance in which the field in the System Information Message comprises the second value and the subscription identifier in the registration request is privacy-protected, provide a registration reject message to the particular user equipment.

28. The non-transitory processor-readable storage medium of claim 27, wherein, in an instance in which the field in the System Information Message comprises the first value, the subscription identifier in the registration request is expected to be privacy protected.

29. The non-transitory processor-readable storage medium of claim 27, wherein, in an instance in which the field in the System Information Message comprises the second value, the subscription identifier in the registration requests is expected to be privacy unprotected.

30. An apparatus comprising:
at least one processor; and
at least one memory storing instructions that, when executed by the at least one processor, cause the apparatus to perform at least:
determining, based on a first message received at the apparatus from a network entity of a communication network, whether the network entity is configured to handle privacy-protected subscription identifiers in registration request messages;
generating a second message comprising a registration request, the second message comprising a subscription identifier for a subscriber of the communication network associated with the apparatus;
determining, based on the first message, whether the subscription identifier in the second message is to be privacy protected;
in an instance in which the subscription identifier in the second message is to be privacy protected,
privacy protecting the subscription identifier in the second message,
adding, to the second message, two or more privacy indicators comprising a field that indicates whether the subscription identifier in the second message is privacy protected, and
adding a first value to the field in the second message, the first value indicating that the subscription identifier in the second message is privacy protected;
in an instance in which the subscription identifier in the second message is not to be privacy protected,
refraining from privacy protecting the subscription identifier in the second message, adding, to the second message, the two or more privacy indicators comprising the field that indicates whether the subscription identifier in the second message in the registration request is privacy protected, and adding a second value to the field in the second message, the second value indicating that the subscription identifier in the second message is not privacy protected; and sending the second message comprising the registration request to the network entity in the communication network.

31. An apparatus comprising:

at least one processor; and at least one memory storing instructions that, when executed by the at least one processor, cause the apparatus to perform at least:

receiving, from a network entity of a new radio standalone network, a system information message, the system information message indicating whether the new radio standalone network is configured to handle concealed subscription identifiers in registration request messages;

determining, based on the system information message received from the network entity, whether the network entity is configured to handle concealed subscription identifiers in registration request messages;

generating a registration request message comprising a registration request and a subscription identifier for a subscriber of the new radio standalone network associated with the apparatus;

determining whether the subscription identifier in the registration request message is to be a concealed subscription identifier;

in an instance in which the subscription identifier in the registration request message is to be a concealed subscription identifier:

privacy-protecting the subscription identifier in the registration request message, adding a privacy indicator field to the registration request message that indicates whether the subscription identifier in the registration request message is a concealed subscription identifier, and setting the privacy indicator field to a first value that indicates that the subscription identifier in the registration request message is a concealed subscription identifier;

in an instance in which the subscription identifier in the registration request message is not to be a concealed subscription identifier:

refraining from privacy-protecting the subscription identifier in the registration request message, adding the privacy indicator field to the registration request message that indicates whether the subscription identifier in the registration request message is a concealed subscription identifier, and setting the privacy indicator field to a second value that indicates that the subscription identifier in the registration request message is not a concealed subscription identifier; and sending, to the network entity in the new radio standalone network, the registration request message comprising the registration request, the subscription identifier, and the privacy indicator field indicating whether the subscription identifier in the registration request message is a concealed subscription identifier.

32. An apparatus comprising:

at least one processor; and at least one memory storing instructions that, when executed by the at least one processor, cause the apparatus to perform at least:

determining whether a communication network is configured to handle concealed subscription identifiers in registration request messages;

generating a message comprising a registration request, the message comprising a subscription identifier for a subscriber of the communication network associated with the apparatus;

determining whether the subscription identifier in the message is to be a privacy-protected subscription identifier;

in an instance in which the subscription identifier in the message is to be a privacy-protected subscription identifier, encrypting the subscription identifier in the message, adding, to the message, two or more privacy indicators comprising a field, the field indicating whether the subscription identifier in the message is privacy protected, and adding a first value to the field in the message, the first value indicating that the subscription identifier in the message is privacy protected;

in an instance in which the subscription identifier in the message is not to be a privacy-protected subscription identifier, refraining from encrypting the subscription identifier in the message, adding, to the message, the two or more privacy indicators comprising the field that indicates whether the subscription identifier in the message is a privacy-protected subscription identifier, and adding a second value to the field in the message, the second value indicating that the subscription identifier in the message is not privacy protected; and sending the message comprising the registration request to a network entity in the communication network.

* * * * *

UNITED STATES PATENT AND TRADEMARK OFFICE
CERTIFICATE OF CORRECTION

| | |
|---|---|
| PATENT NO. | : 11,792,172 B2 |
| APPLICATION NO. | : 15/794856 |
| DATED | : October 17, 2023 |
| INVENTOR(S) | : Suresh P. Nair et al. |

It is certified that error appears in the above-identified patent and that said Letters Patent is hereby corrected as shown below:

In the Claims

In Column 22, Line 15, Claim 27, delete "determine respective" and insert -- determine --, therefor.

Signed and Sealed this
Twenty-seventh Day of February, 2024

Katherine Kelly Vidal
*Director of the United States Patent and Trademark Office*